US012562561B2

(12) United States Patent
Ionescu

(10) Patent No.: US 12,562,561 B2
(45) Date of Patent: Feb. 24, 2026

(54) ARC FAULT SOLUTION FOR MULTIPLE ELECTRIC DEVICES

(71) Applicant: Innomotics GmbH, Nuremberg (DE)

(72) Inventor: Bogdan Cristian Ionescu, Carlsbad, CA (US)

(73) Assignee: Innomotics GmbH, Nuremberg (DE)

( * ) Notice: Subject to any disclaimer, the term of this patent is extended or adjusted under 35 U.S.C. 154(b) by 156 days.

(21) Appl. No.: 18/556,714

(22) PCT Filed: May 21, 2021

(86) PCT No.: PCT/US2021/033742
§ 371 (c)(1),
(2) Date: Oct. 23, 2023

(87) PCT Pub. No.: WO2022/245375
PCT Pub. Date: Nov. 24, 2022

(65) Prior Publication Data
US 2024/0213756 A1 Jun. 27, 2024

(51) Int. Cl.
*H02H 1/00* (2006.01)
*H02H 3/16* (2006.01)

(52) U.S. Cl.
CPC .......... *H02H 1/0023* (2013.01); *H02H 3/165* (2013.01)

(58) Field of Classification Search
CPC ........ H02H 1/0023; H02H 3/083; H02H 3/10; H02H 3/165; H02H 7/222; H01H 33/26; H01H 2001/5827; H01H 33/666; H01H 79/00; H01H 9/50
See application file for complete search history.

(56) References Cited

U.S. PATENT DOCUMENTS

| | | | |
|---|---|---|---|
| 5,933,308 A | 8/1999 | Garzon | |
| 6,512,669 B1 | 1/2003 | Goodwin et al. | |
| 7,499,251 B2 * | 3/2009 | Byron | H02H 1/0015 361/42 |
| 8,964,344 B2 * | 2/2015 | Spangenberg | H02H 7/222 361/8 |
| 9,325,167 B2 * | 4/2016 | Kumfer | H02H 9/043 |
| 10,533,978 B2 * | 1/2020 | Benke | G01N 29/46 |
| 2013/0020182 A1 * | 1/2013 | Bozek | H02H 1/0023 200/50.21 |
| 2014/0043714 A1 | 2/2014 | Benke | |
| 2014/0055886 A1 | 2/2014 | Liptak | |
| 2017/0301489 A1 * | 10/2017 | Palvadi | H01H 33/08 |
| 2024/0405522 A1 * | 12/2024 | Ionescu | H02B 1/32 |

FOREIGN PATENT DOCUMENTS

EP 0740319 A1 10/1996

* cited by examiner

*Primary Examiner* — Danny Nguyen
*Assistant Examiner* — Nicolas Bellido
(74) *Attorney, Agent, or Firm* — Henry M. Feiereisen LLC

(57) ABSTRACT

An electric system includes a plurality of electric devices, each electric device having a cabinet, a common power source, each electric device being electrically coupled to the common power source, wherein a first electric device includes an arc fault rated cabinet and an arc quenching device, and wherein, in an event of an electric arc occurring in any of the plurality of electric devices, energy of the arc is transferred to the first electric device and the arc quenching device activated.

15 Claims, 2 Drawing Sheets

116-1

ARC FAULT SOLUTION FOR MULTIPLE ELECTRIC DEVICES

BACKGROUND

1. Field

Aspects of the present disclosure generally relate to an arc fault solution in connection with multiple electric devices such as for example variable frequency drives, transformers and circuit breakers.

2. Description of the Related Art

An electric device such as for example a variable frequency drive is typically housed in an enclosure or cabinet. Arc faults may occur within enclosures or cabinets due to for example faulty connections. An internal short circuit may result in an arc fault. Air is ionized between two or more potentials in the electric device by the arc fault, causing an arc flash comprising a plasma cloud of rapidly expanding vaporized metallic materials. The plasma causes high pressures and temperatures to build up quickly, in fractions of a second, within the enclosure. The arc fault conditions must either be contained within the enclosure or vented to the outside of the electric device enclosure.

Arc fault effects are devastating for the equipment where it occurs and secondary effects such as explosive elimination of shrapnel and toxic gases cause serious hazards for personnel. While the electric arc is burning, significant damage of components inside the cabinet occurs in part due to the uncontrolled way the arc is burning. Additionally, the electric arc tends to move inside the cabinet away from the source of energy. This way the damage inside is substantial and as a rule causes permanent damage to the entire cabinet and its contents.

SUMMARY

Briefly described, aspects of the present disclosure relate to an arc fault solution for multiple electric devices, in particular electric devices comprising an enclosure, cabinet or housing. For example, the multiple electric devices comprise multiple variable frequency drives. Throughout the specification, the terms "drive", "drive system", "multilevel power converter", "converter", "power supply" and "variable frequency drive (VFD)" can be used interchangeably.

According to a first aspect of the present disclosure, an electric system comprises a plurality of electric devices, each electric device comprising a cabinet, a common power source, each electric device being electrically coupled to the common power source, wherein a first electric device comprises an arc fault rated cabinet and an arc quenching device, and wherein, in an event of an electric arc occurring in any of the plurality of electric devices, energy of the arc is transferred to the first electric device and the arc quenching device activated.

According to a second aspect of the present disclosure, an electric device comprises an arc fault rated cabinet rated to resist an electric arc, an arc quenching device, and a global arc fault signal interface, wherein the global arc fault signal interface comprises multiple inputs and at least one output and is configured to receive an arc fault signal from another arc fault signal interface of another electric device via one of the inputs, and activate the arc quenching device via the at least one output.

DETAILED DESCRIPTION

To facilitate an understanding of embodiments, principles, and features of the present disclosure, they are explained hereinafter with reference to implementation in illustrative embodiments. In particular, they are described in the context of being an electric system comprising multiple electric devices, specifically a drive system comprising multiple variable frequency drives. Embodiments of the present disclosure, however, are not limited to use in the described methods or system.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
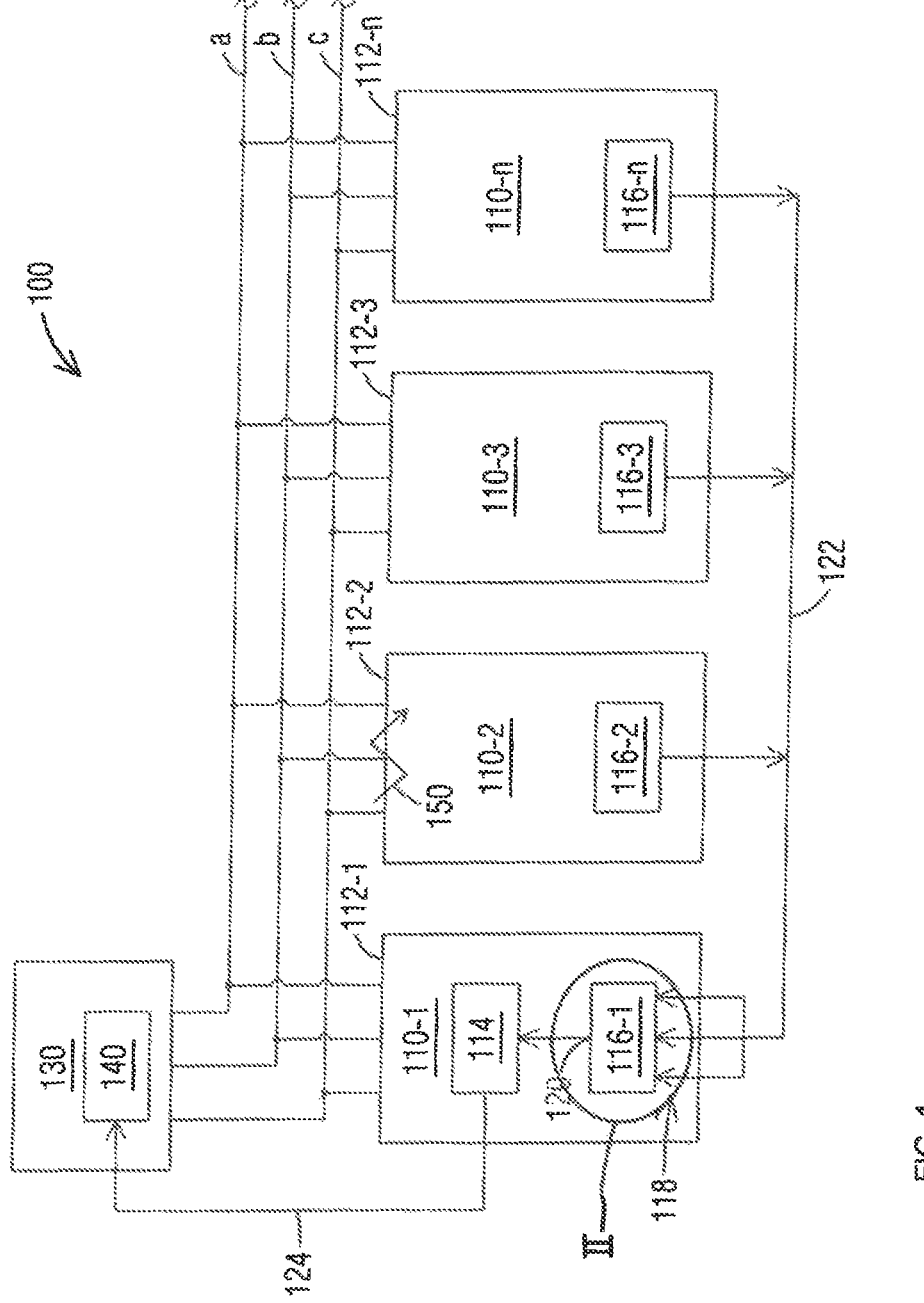
FIG. 1 illustrates a diagram of an electric system with an arc fault solution for multiple electric devices in accordance with an exemplary embodiment of the present disclosure.

FIG. 1 illustrates a diagram of an electric system 100 with an arc fault solution for multiple electric devices in accordance with an exemplary embodiment of the present disclosure.

The electric system 100 comprises a plurality of electric devices 110-1, 110-2, 110-3, 110-*n*. Each electric device 110-1, 110-2, 110-3, 110-*n* comprises a cabinet or enclosure 112-1, 112-2, 112-3, 112-*n*. The cabinet 112-1, 112-2, 112-3, 112-*n* comprises metal and houses electric and/or electronic components. The multiple electric devices 110-1, 110-2, 110-3, 110-*n* are for example variable frequency drives, transformers, or many other types of electric devices or systems. Each electric device 110-1, 110-2, 110-3, 110-*n* is an individual, separate device. It should be noted that there is no limitation as to a number of electric devices 110-1, 110-2, 110-3, 110-*n* connected within the system 100. The system 100 may comprise two electric devices or may comprise ten electric devices.

The system 100 further comprises a common electric power source 130, wherein each electric device 110-1, 110-2, 110-3, 110-*n* is electrically coupled to the power source 130 for receiving electric power from the power source 130. The power source 130 can be an electric energy source or an electrical substation, such as a transmission substation, of an electrical power transmission and distribution system. The electric power source 130 provides three-phase alternating current (AC) power, illustrated in FIG. 1 by phases a, b, c, wherein the electric devices 110-1, 110-2, 110-3, 110-*n* can be configured to output three-phase power to load, such as for example a three-phase AC motor.

In an exemplary embodiment of the present disclosure, the electric system 100 is equipped with an arc fault solution for the plurality of electric devices 110-1, 110-2, 110-3, 110-*n*.

As described earlier, electric arcs/arc faults may occur within enclosures or cabinets due to for example faulty connections. An internal short circuit may result in an arc fault. Air is ionized between two or more potentials in the electric device by the arc fault, causing an arc flash comprising a plasma cloud of rapidly expanding vaporized metallic materials. The plasma causes high pressures and temperatures to build up quickly, in fractions of a second, within the enclosure. The arc fault conditions must either be contained within the enclosure or vented to the outside of the electric device enclosure.

In an exemplary embodiment, the system 100 is configured such that arc fault protection is provided for all the electric devices 110-1, 110-2, 110-3, 110-n, wherein only one of the electric devices 110-1, 110-2, 110-3, 110-n comprises arc fault equipment. Arc fault equipment as used herein comprises at least an arc quenching device and an arc fault rated cabinet.

Specifically, with reference to FIG. 1, first electric device 110-1 comprises an arc fault rated cabinet 112-1 and an arc quenching device 114. The electric device 110-1 comprising the arc fault equipment is herein also referred to as master electric device. However, it should be noted that any of the electric devices 110-1, 110-2, 110-3, 110-n may be configured as the master electric device comprising arc fault equipment.

In an event of an electric arc occurring in any of the plurality of electric devices 110-1, 110-2, 110-3, 110-n, energy of the arc is transferred to the master electric device 110-1. Due to the arc fault rated cabinet 112-1 and the arc quenching device 114, the master electric device 110-1 is able to handle and remedy the electric arc. While arc fault detection is present in each of the electric devices 110-1, 110-2, 110-3, 110-n, only one electric device with arc fault equipment is required, e. g. the master electric device 110-1.

In an exemplary embodiment of the present disclosure, each electric device 110-1, 110-2, 110-3, 110-n comprises an arc fault signal interface 116-1, 116-2, 116-3, 116-n. The arc fault signal interface 116-1 of the master electric device 110-1 is configured as global arc fault signal interface to receive arc fault signals from all the electric devices 110-1, 110-2, 110-3, 110-n. The arc fault signal interfaces 116-2, 116-3, 116-n of the remaining electric devices 110-2, 110-3, 110-n (that are not the master electric device) may be referred to as local arc fault signal interfaces.

The global arc fault signal interface, e. g. interface 116-1, is configured as global interface as well as local interface for the master device 110-1. On the one hand, the global interface 116-1 is configured to receive and process arc fault signals from other electric devices 110-2, 110-3, 110-n, but, on the other hand, also monitors the master electric device 110-1 with respect to potential electric arcs.

The arc fault signal interfaces 116-1, 116-2, 116-3, 116-n can be configured as printed circuit boards (PCB) comprising electronic components, such as inputs, outputs, circuits etc. The global arc fault signal interface 116-1 comprises multiple inputs 118 and at least one output 120. Via the multiple inputs 118, the global interface 116-1 can receive arc fault signals from the local arc fault signal interfaces 116-2, 116-3, 116-n via connections 122. Via the at least one output 120, the global interface 116-1 can activate the arc fault equipment, e.g. arc quenching device 114.

Figure 2:
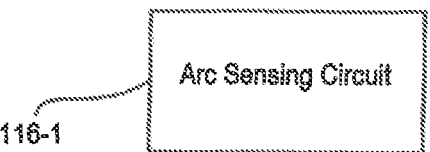
FIG. 2 is an exemplified schematic Illustration of the area marked II in FIG. 1.

The arc fault signal interfaces 116-1, 116-2, 116-3, 116-n each comprise an arc sensing circuit (FIG. 2) configured to monitor characteristics of an electric arc within the cabinets 112-1, 112-2, 112-3, 112-n, respectively. Characteristics of an electric arc include current, specifically overcurrent, and light, specifically flashlight. Thus, the sensing circuit comprises (over-) current detection and flashlight detection, wherein current and light are continuously monitored by the sensing circuit of the arc fault signal interfaces 116-1, 116-2, 116-3, 116-n.

When an arc fault signal interface 116-1, 116-2, 116-n, 116-3, detects an electric arc (based on detected overcurrent and/or flashlight) in the respective cabinet 112-1, 112-2, 112-3, 112-n, the respective arc fault signal interface 116-1, 116-2, 116-n, 116-3, transmits an arc fault signal to the global arc fault signal interface 116-1 of the master electric device 112-1 via connection(s) 122. Such an arc fault signal is transmitted within microseconds. The arc fault signal is received via one of the inputs 118 at the global arc fault signal interface 116-1.

Upon receiving an arc fault signal, either via connection 122 from another (external) an interface 116-2, 116-3, 116-n or from its own internal interface 116-1, the global arc fault signal interface 116-1 activates the arc quenching equipment, specifically the arc quenching device 114 via an electronic signal. The at least one output 120 of the global arc fault signal interface 116-1 is coupled to the arc quenching device 114 and transmits an electronic activation signal to the arc quenching device 114. The arc quenching device 114, for example via an arc protection relay, sends a trip signal 124 to a circuit breaker 140 and, at the same time, performs quenching of the arc.

The circuit breaker 140 disconnects the common power source 130 from the plurality of electric devices 110-1, 110-2, 110-3, 110-n. A controller of the arc quenching device 114 controls one or more switching units of the quenching device 114. The one or more switching units are controlled to rapidly close a main current path of the electric device 112-1 to earth, thereby creating a lower-impedance current path to the fault current and transforming the open arc into a controlled 3-phase metallic short circuit. In other words, the arc quenching device 114 converts the electric arc into a bolted short circuit. This way, energy of the electric arc is transferred from a location of the arc to the arc fault rated cabinet 112-1 of the master electric device 110-1, and release of arc fault plasma is stopped rapidly inside the affected cabinet. The arc fault rated cabinet 112-1 is rated to resist an electric arc occurring in the cabinet 112-1. Further, electric/electronic components and circuits in the arc fault rated cabinet 112-1 are designed to withstand short circuit electrodynamic forces.

In another exemplary embodiment, the system 100 comprises monitoring of the arc fault signal interfaces 116-1, 116-2, 116-3, 116-n, specifically to ensure that the arc sensing circuits of each interface 116-1, 116-2, 116-3, 116-n is functioning properly and that there is no interruption in a detection capability in the electric devices 110-1, 110-2, 110-3, 110-n. In an example, the monitoring may be a periodic monitoring utilizing for example 'heart-beat' monitoring. 'Heart-beat' is a term borrowed from human physiology and describes a safety feature allowing the global arc fault signal interface 116-1 to detect potential interrupted/malfunctioning circuits in the arc fault signal interfaces 116-1, 116-2, 116-3, 116-n. For example, the global arc fault signal interface 116-1 may send a signal to the local arc fault signal interfaces 116-2, 116-3, 116-n, wherein the local arc fault signal interfaces 116-2, 116-3, 116-n can be configured to confirm receipt of the signal, for example by returning a confirm signal to the global interface 116-1. A periodically received heart-beat signal means that the respective interface tasked to detect an arc fault is functioning properly. The global interface 116-1 needs to receive such signals from all protected devices 110-1, 110-2, 110-3, 110-n, else a warning is issued, and certain action may need to be taken (e. g. repair or replace the respective interface). In a different scenario, each electric device 110-1, 110-2, 110-2, 110-n can be configured to monitor its own arc fault signal interface 116-1, 116-2, 116-3, 116-n separately and independently.

For example, if an electric arc 150 occurs within cabinet 112-2 of electric device 110-2, the arc fault signal interface 116-2 of device 110-2 will detect the electric arc 150, utilizing its arc sensing circuit and based on overcurrent and/or flashlight, in the cabinet 112-2. The arc fault signal interface 116-2 then transmits an arc fault signal to the global arc fault signal interface 116-1 of the master electric device 112-1 via electronic connection 122. Such an arc fault signal is transmitted within microseconds and is received at one of the inputs 118 of the global arc fault signal interface 116-1.

Upon receiving the arc fault signal, the global arc fault signal interface 116-1 triggers the arc quenching device 114, wherein the at least one output 120 of the global arc fault signal interface 116-1 transmits a signal to the arc quenching device 114 for activation. Based on the signal, the arc quenching device 114, for example via an arc protection relay, simultaneously sends a trip signal to a circuit breaker 140 and performs quenching of the arc.

In another example, if an electric arc occurs within cabinet 112-1 of master electric device 110-1, the arc fault signal interface 116-1 of device 110-1 will detect the electric arc 150, utilizing its arc sensing circuit and based on overcurrent and/or flashlight, in the cabinet 112-1. Upon detecting the electric arc 150, the arc fault signal interface 116-1 triggers the arc quenching device 114, wherein the at least one output 120 of the global arc fault signal interface 116-1 transmits a signal to the arc quenching device 114 for activation. Based on the signal, the arc quenching device 114, for example via an arc protection relay, simultaneously sends a trip signal to a circuit breaker 140 and performs quenching of the arc.

As described before, the global arc fault signal interface 116-1 is configured to receive and process arc fault signals from other electric devices 110-2, 110-3, 110-n, as well as to monitor the master device 110-1 itself with respect to potential electric arcs and trigger the arc quenching device 114 accordingly.

In an exemplary embodiment of the present disclosure, the plurality of electric devices 110-1, 110-2, 110-3, 110-n comprise variable frequency drives, for example medium voltage variable frequency drives and/or low voltage variable frequency drives (medium/low voltages referring to an input voltage of the devices), that receive energy from a common power source and require arc fault protection. As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

In an example, the electric devices 110-1, 110-2, 110-3, 110-n are variable frequency drives comprising a plurality of power cells supplying power to one or more output phases. Medium voltage variable frequency drives, such as for example multilevel power converters, are used in applications of medium voltage alternating current drives, flexible AC transmission systems (FACTS), and High Voltage DC (HVDC) transmission systems, because single power semiconductor devices cannot handle high voltage. Multilevel power converters typically include a plurality of power cells for each phase, each power cell including an inverter circuit having semiconductor switches that can alter the voltage output of the individual cells. One example of a multilevel power converter is a cascaded H-bridge converter system having a plurality of H-bridge cells as described for example in U.S. Pat. No. 5,625,545 to Hammond, the content of which is herein incorporated by reference in its entirety.

In the embodiment that the electric devices 110-1, 110-2, 110-3, 110-n are configured as VFDs, specifically medium voltage VFDs, medium voltage circuits within the arc fault rated cabinet 112-1 of the master electric device 110-1 are configured and designed to withstand short circuit electro-dynamic forces during an event of an electric arc and arc quenching performance.

The described system 100 including arc fault solution provides arc fault protection to multiple devices 110-1, 110-2, 110-3, 110-3 and cabinets 112-1, 112-2, 112-3, 112-n that are connected to the same electric energy source 130. Thus, the solution is very cost effective because it requires only a single arc quenching device 114 to protect multiple devices 110-1, 110-2, 110-3, 110-n that can be of different types and with different power ratings. Further, there is no need to have plasma exhaust systems in any of the cabinets 112-1, 112-2, 112-3, 112-n, including in the arc fault rated cabinet 112-1, due to the use of the arc quenching device 114. Thus, any toxic gases or plasma are not released, which provides safety for personnel working in the vicinity of the system 100 and devices 110-1, 110-2, 110-3, 110-n.

Furthermore, the arc fault solution can be easily retrofitted to already installed systems of multiple devices by adding the arc fault equipment, including the arc fault signal interfaces with arc sensing circuits, the arc fault rated cabinet and the arc quenching device. The application for use in existing equipment reduces cost and inconvenience to the user/personnel of the system.

The invention claimed is:

1. An electric system, comprising:
   a plurality of electric devices, each electric device comprising a cabinet,
   a common power source, each electric device being electrically coupled to the common power source,
   wherein a first electric device comprises an arc fault rated cabinet and an arc quenching device, and
   wherein, in an event of an electric arc occurring in any of the plurality of electric devices, energy of the electric arc is transferred to the first electric device and the arc quenching device activated,
   wherein the plurality of electric devices comprises variable frequency drives, each variable frequency drive comprising a plurality of power cells supplying power to one or more output phases.

2. The electric system of claim 1,
   wherein each electric device comprises an arc fault signal interface,
   wherein an arc fault signal interface of the first electric device is configured to receive arc fault signals from the plurality of electric devices.

3. The electric system of claim 2,
   wherein the arc fault signal interface of each electric device comprises an arc sensing circuit configured to monitor characteristics of the electric arc.

4. The electric system of claim 3,
   wherein the arc sensing circuit is configured to continuously monitor electric current and light within the cabinet of the electric device.

5. The electric system of claim 4,
   further comprising periodic monitoring of the arc fault signal interfaces to ensure that the arc sensing circuits are intact.

6. The electric system of claim 5, wherein the arc fault signal interface of the first electric device is configured to monitor the arc fault signal interfaces by sending test signals to the arc fault signal interfaces.

7. The electric system of claim 3, further comprising periodic monitoring of the arc fault signal interfaces to ensure that the arc sensing circuits are intact.

8. The electric system of claim 2, wherein each arc fault signal interface is configured to transmit an arc fault signal in response to a detected electric arc.

9. The electric system of claim 1, further comprising: a circuit breaker for disconnecting the common power source from the plurality of electric devices, wherein the circuit breaker is activated by the arc quenching device in response to an arc fault signal.

10. The electric system of claim 1, wherein the plurality of electric devices comprises medium voltage variable frequency drives and/or low voltage variable frequency drives.

11. An electric device, comprising:

an arc fault rated cabinet rated to resist an electric arc, an arc quenching device, and a global arc fault signal interface, wherein the global arc fault signal interface comprises multiple inputs and at least one output and is configured to receive an arc fault signal from another arc fault signal interface of another electric device via one of the inputs, and activate the arc quenching device via the at least one output, wherein the electric device is configured as a medium voltage variable frequency drive comprising multiple power cells, wherein medium voltage circuits of the multiple power cells are configured to withstand short circuit electro-dynamic forces in an event of the electric arc.

12. The electric device of claim 11, wherein the global arc fault signal interface further comprises an arc sensing circuit configured to monitor characteristics of the electric arc within the arc fault rated cabinet.

13. The electric device of claim 12, wherein the global arc fault signal interface is configured to monitor the arc sensing circuit of the global arc fault signal interface and arc sensing circuits of the other arc fault signal interface to ensure that the arc sensing circuits are intact.

14. The electric device of claim 11, wherein energy of the electric arc occurring in the other electric device is transferred to the arc fault rated cabinet.

15. An electric system, comprising:

a plurality of electric devices, each electric device comprising a cabinet, a common power source, each electric device being electrically coupled to the common power source, wherein a first electric device comprises an arc fault rated cabinet and an arc quenching device, and wherein, in an event of an electric arc occurring in any of the plurality of electric devices, energy of the electric arc is transferred to the first electric device and the arc quenching device activated, wherein each electric device comprises an arc fault signal interface, wherein an arc fault signal interface of the first electric device is configured to receive arc fault signals from the plurality of electric devices, wherein the arc fault signal interface of each electric device comprises an arc sensing circuit configured to monitor characteristics of the electric arc;

the electric system further comprising periodic monitoring of the arc fault signal interfaces to ensure that the arc sensing circuits are intact.

\* \* \* \* \*